(12) United States Patent
Wang et al.

(10) Patent No.: US 9,553,504 B2
(45) Date of Patent: Jan. 24, 2017

(54) POWER FACTOR CORRECTION CONTROL CIRCUIT AND POWER ADAPTER THEREOF

(71) Applicant: General Luminaire Co., Ltd., Taipei (TW)

(72) Inventors: Yung-Hong Wang, Taipei (TW); Zhi-Jian Fan, Shanghai (CN)

( * ) Notice: Subject to any disclaimer, the term of this patent is extended or adjusted under 35 U.S.C. 154(b) by 188 days.

(21) Appl. No.: 14/312,700

(22) Filed: Jun. 24, 2014

(65) Prior Publication Data
US 2015/0372586 A1    Dec. 24, 2015

(51) Int. Cl.
*H02M 1/42* (2007.01)
*H02M 1/00* (2006.01)

(52) U.S. Cl.
CPC ... *H02M 1/4258* (2013.01); *H02M 2001/0012* (2013.01); *Y02B 70/126* (2013.01)

(58) Field of Classification Search
CPC .... H02M 1/42; H02M 1/4208; H02M 1/4233; H02M 1/4258; H02M 3/33507; H02M 3/33523; H02M 1/4528; H02M 2001/0012
See application file for complete search history.

(56) References Cited

U.S. PATENT DOCUMENTS

2012/0262961 A1*  10/2012  Chien .............. H02M 3/33507
                                                   363/84

* cited by examiner

*Primary Examiner* — Adolf Berhane
*Assistant Examiner* — Henry Lee, III

(57) ABSTRACT

Disclosed are a power factor correction circuit and a power adapter, and the power factor correction circuit includes a sampler, a controller and a current limiter, and the controller includes an error amplification unit, a peak value adjusting unit, an ON/OFF computing unit and a phase lock unit. The sampler is coupled to the phase lock unit, and the current limiter is coupled to the error amplification unit and the ON/OFF computing unit, so as to achieve the effects of enhancing the power factor property of the power factor correction circuit, lowering the manufacturing cost, and improving the electric power utilization.

8 Claims, 6 Drawing Sheets

POWER FACTOR CORRECTION CONTROL CIRCUIT AND POWER ADAPTER THEREOF

BACKGROUND OF THE INVENTION

1. Field of the Invention

The present invention relates to the field of electronic technology, and more particularly to a power factor correction (PFC) control circuit and a power adapter of an electronic device such as a liquid crystal display (LCD), a television (TV) or a light emitting diode (LED) lamp.

2. Description of the Related Art

To provide an appropriate and stable power to an electronic device, the electronic device is usually equipped with a power adapter. In general, most conventional power adaptors adopt a pulse width modulation (PWM) for controlling the voltage or current value of an output power supply. Power factor (PF) refers to the relation between effective power and total power consumption (or apparent power), or the ratio of the effective power to the total power consumption (or apparent power), which is used for utilizing a constant power effectively, and thus the power factor is an important indicator of the properties of a constant power adapter. To enhance the PF property, the utilization of electric power, a power adapter generally comes with a PFC control circuit.

With reference to FIG. 1 for a conventional PFC control circuit, and the conventional PFC control circuit comprises a rectifier 10, a coupling transformer 11, a current limiting switch 12, a first resistor 13, a second resistor 14, a controller 15 and a current limiter 16, wherein the second resistor 14, the controller 15 and the current limiter 16 are operated at a discontinuous conduction mode (DCM) to output a stable current and prevent an over-current. The coupling transformer 11 comprises a primary coil, a secondary coil and an auxiliary coil NA, and the controller 15 comprise a first comparator 151, a second comparator 152, a logic gate 153, a trigger 154 and an optical coupler (OC) 155, and the current limiter 16 comprises a first multiplier 161 and a second multiplier 162. The current limiting switch 12 is a triode having a collector coupled to the primary coil, and a base coupled to an output terminal of the trigger 154, and an end of the first resistor 13 is grounded and the other end of the first resistor 14 is coupled to an emitter of the current limiting switch 12. The first multiplier 161 and the second multiplier 162 of the current limiter 16 are coupled to output terminals of the trigger respectively. The rectifier 10 converts the utility power (AC) into a primary current Ip (DC), and then input voltage are formed at both ends of the input voltage of the primary coil of the coupling transformer 11, and the secondary coil generates an induced current Is, and the auxiliary coil generates a detect current Ia, and the first resistor 13 senses the primary current Ip to output a sensing signal to the controller 15. The auxiliary coil is serially coupled to the second resistor 14, so that the second resistor 14 can sense the primary current Ip to output a detect signal to the controller 15. After the first multiplier 161 and the second multiplier 162 compute the received PWM signal and reference signal, a compare signal increasing with time is outputted to the controller 15, and the controller 15 processes the sensing signal, the detect signal, the compare signal and the coupling signal outputted from the optical coupler 155 to generate and transmit a setting signal or a clear signal to the current limiting switch 12, and the current limiting switch 12 switches its status according to the received setting signal or clear signal to control the secondary coil, so as to generate a stable induced current Is and overcome the over-current issue caused by the circuit latency effect. Although the aforementioned PFC control circuit provides the over-current protection effect, yet the circuit employs the optical coupler which incurs a larger volume and a higher cost, and the multiplication circuit also causes an input voltage harmonic in the output current of the entire circuit, and results in a greater total harmonic distortion (THD) and a smaller PF property, and thus wasting energy.

SUMMARY OF THE INVENTION

Therefore, it is a primary objective of the present invention to overcome the drawbacks of the prior art by providing a power factor correction circuit and a power adapter. The power factor correction circuit comprises a sampler, a controller and a current limiter, and the sampler, the controller and the current limiter are sequentially and electrically coupled to one another, and the controller comprises an error amplification unit, a peak value adjusting unit, an ON/OFF computing unit and a phase lock unit, and the sampler is coupled to the phase lock unit, and the current limiter is coupled to the error amplification unit and the ON/OFF computing unit.

The power adapter comprises an input module, a power conversion module and an output module, and the power conversion module comprises an input terminal, a control terminal and the aforementioned power factor correction circuit, and the power factor correction control circuit is coupled between the input terminal and the output terminal.

The present invention not just improves the power factor correction of the power adapter and the power factor of the circuit only, but also skips the optical coupler to lower the manufacturing cost. In addition, the present invention has the filter circuit to reduce the total harmonic distortion of the circuit, so as to further enhance the electric power utilization.

DETAILED DESCRIPTION OF THE PREFERRED EMBODIMENTS

The technical content of the present invention will become apparent with the detailed description of preferred embodiments and the illustration of related drawings as follows. It is noteworthy that the preferred embodiments are provided for illustrating the present invention, but not intended for limiting the scope of the invention.

Figure 3:
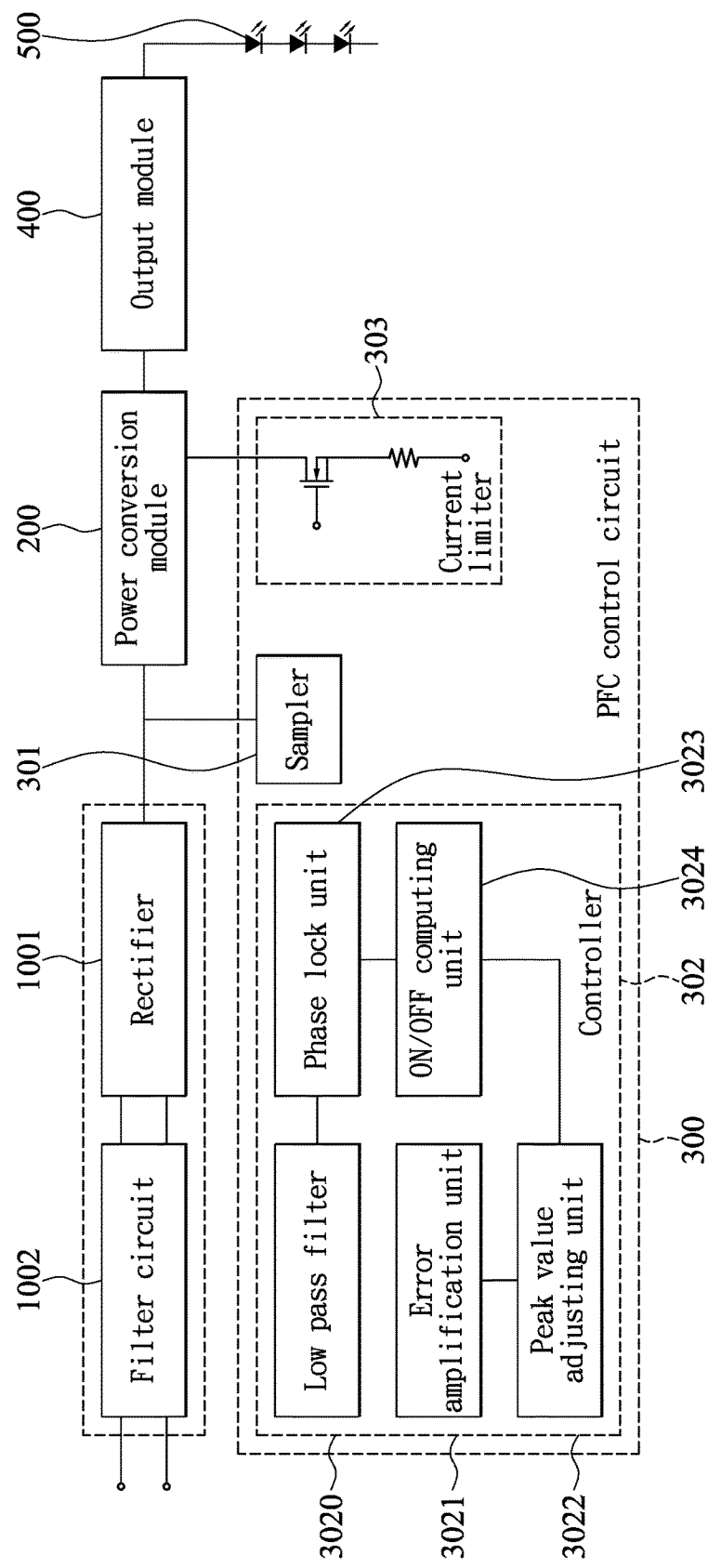
FIG. 3 is a schematic block diagram of a preferred embodiment of the present invention.
Figure 5:
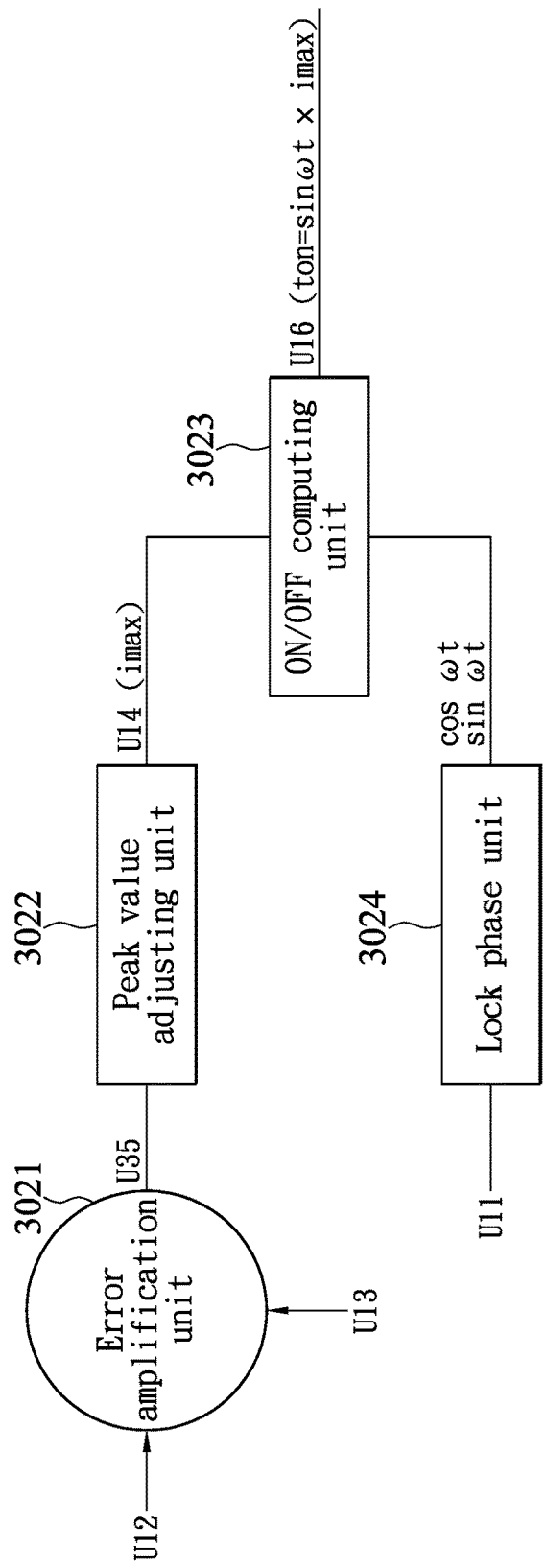
FIG. 5 is a schematic block diagram of a power factor correction circuit in accordance with a preferred embodiment of the present invention.

With reference to FIGS. 3 and 5 for a power factor correction circuit of the first preferred embodiment of the present invention, the power factor correction circuit 300 comprises a sampler 301, a controller 302 and a current limiter 303 sequentially and electrically coupled to one another. The controller 302 comprises an error amplification unit 3021, a peak value adjusting unit 3022, an ON/OFF computing unit 3023 and a phase lock unit 3024 sequentially and electrically coupled to one another, and the sampler 301 is coupled to the phase lock unit 3024, and the current limiter 303 is coupled to the error amplification unit 3021 and the ON/OFF computing unit 3023 respectively. The power factor correction circuit 300 is installed in the power adapter for adjusting a signal outputted from the power adapter. The power adapter comprises an input module 100, a power conversion module 200 and an output module 400. The power conversion module 200 comprises an input terminal, an output terminal and a control terminal, and an end of the sampler 301 is coupled to an input terminal of the power converter, and an end of the current limiter 303 is coupled to a control terminal of the power converter. The error amplification unit 3021 is provided for receiving a signal U12 (outputted from the current limiter 303 and having a value of dc) outputted from the current limiter 303, amplifying the signal according to a reference signal U13 (having a value of ref) and performing the error amplification of the signal U12 outputted from the current limiter 303 to obtain an error signal U35 (having a value of err3). The peak value adjusting unit 3022 is provided for receiving the error signal U35 and performing a peak value computation to form a maximum peak signal U14 (having a value of imax), and the phase lock unit 3024 is provided for receiving sampling signal U11 (having a value of in1) outputted from the sampler 301 and performing a sine variation computation to form a sine variation signal U15 (having a value of $\sin\alpha t$). The ON/OFF computing unit 3023 is provided for receiving the maximum peak signal U14 and the sine variation signal U15, and multiplying the two to form a correction signal U16 (having a value of ton, and ton=$\sin\alpha t \times$imax) and outputting the correction signal U16 to the current limiter 303. The current limiter 303 controls the operating status according to the correction signal U16 in order to control the power conversion module 200.

Figure 4:
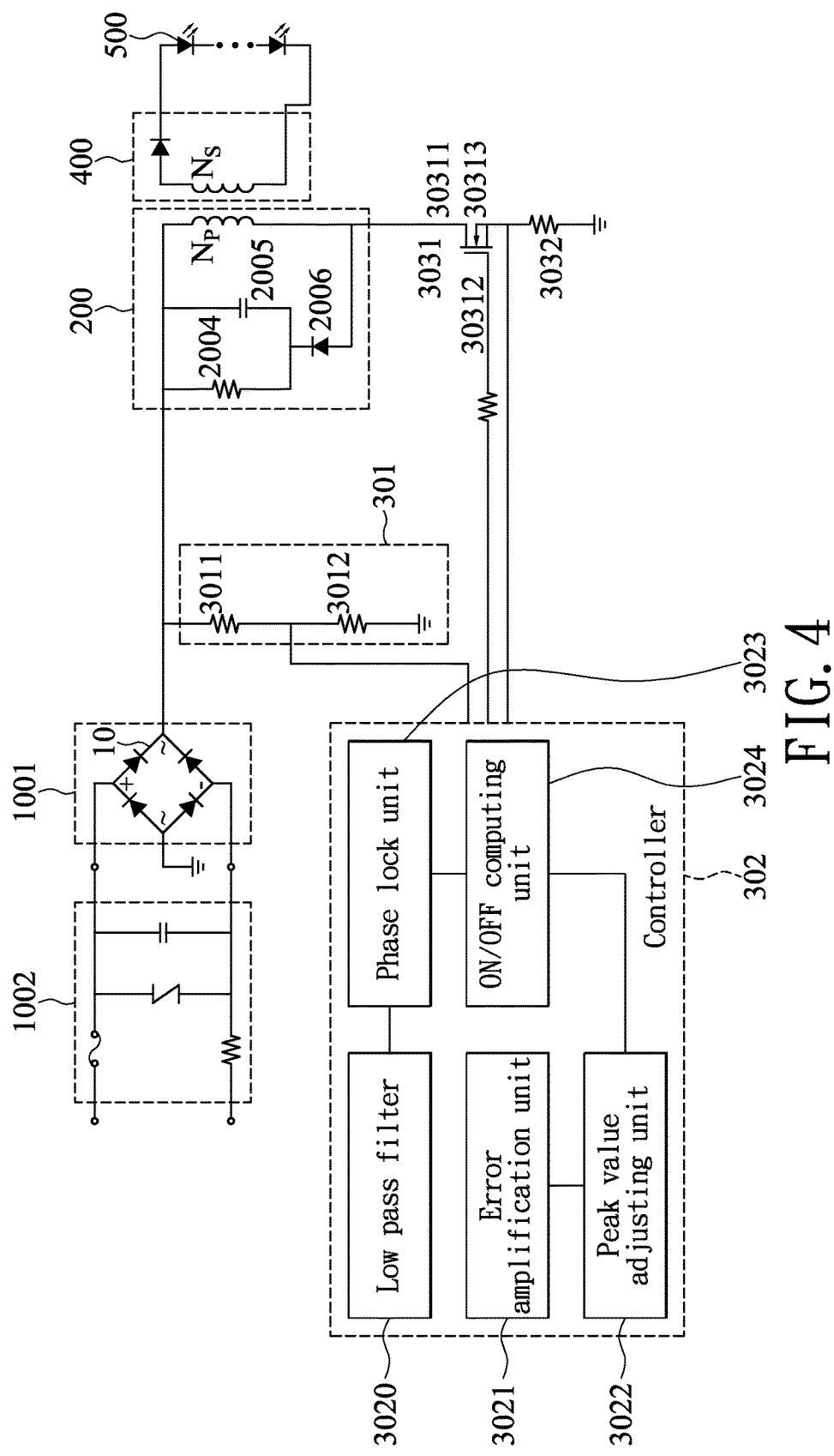
FIG. 4 is a schematic circuit diagram of a preferred embodiment of the present invention.

In FIG. 4, a low-pass filter unit is electrically coupled between the sampler 301 and the phase lock unit 3024 for filtering the sampling signal U11 outputted from the sampler 301, so as to achieve the effects of filtering the voltage harmonic wave in the sampling signal U11 outputted from the sampler 301, reducing the total harmonic distortion of the power factor correction circuit 300, and enhancing the electric power utilization.

Figure 6:
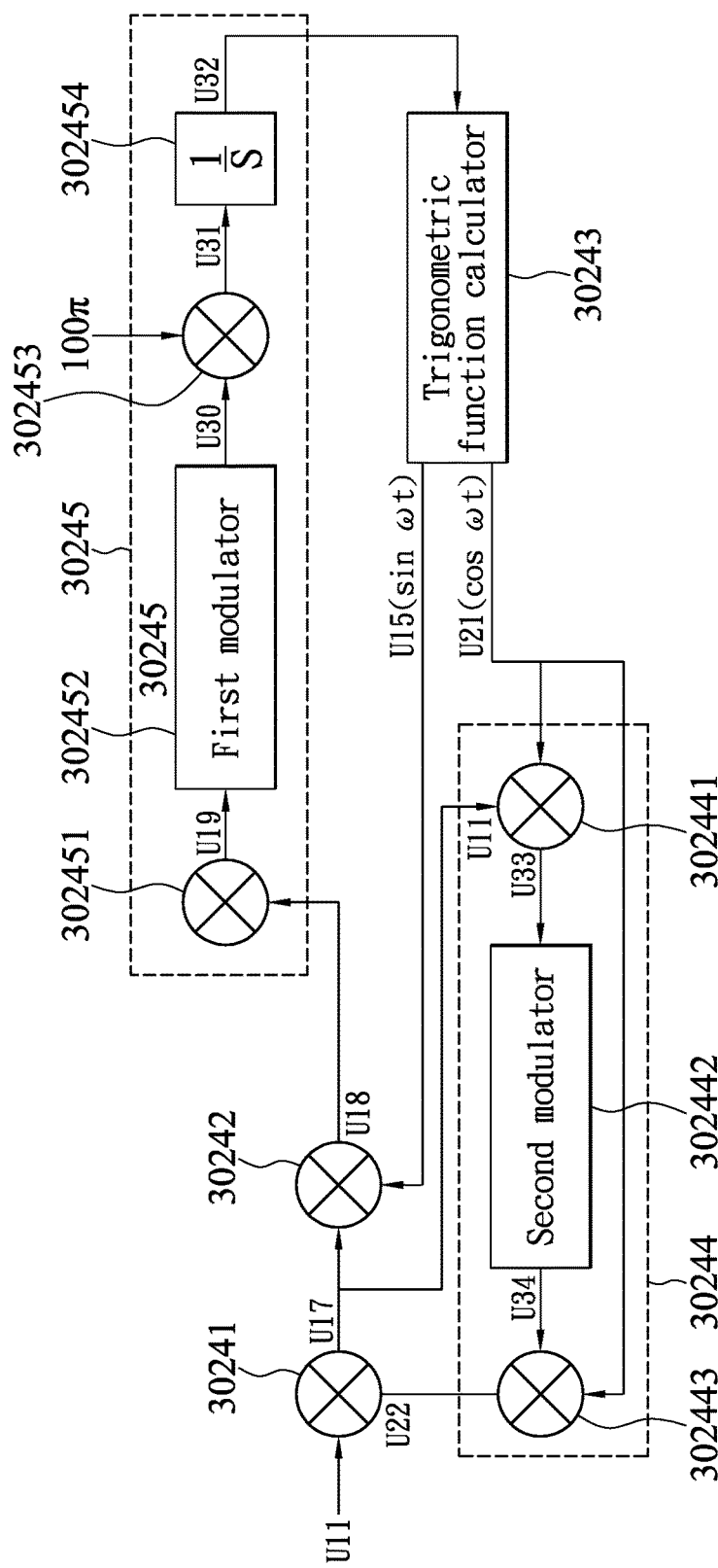
FIG. 6 is a schematic block diagram of a phase lock unit of a preferred embodiment of the present invention.

In FIG. 6, the phase lock unit 3024 comprises a first adder 30241, a first multiplier 30242, a trigonometric function calculator 30243, a feedback circuit 30244 and a computing circuit 30245, wherein the first adder 30241, the first multiplier 30242, the computing circuit 30245 and the trigonometric function calculator 30243 are electrically coupled to one another, and the feedback circuit 30244 is coupled between the first adder 30241 and the trigonometric function calculator 30243. The sampling signal U1f outputted from the sampler 301 is processed by the first adder 30241, the first multiplier 30242, the computing circuit 30245 and the trigonometric function calculator 30243 to obtain the sine variation signal U15 (having a value of $\sin\alpha t$). The trigonometric function calculator 30243 outputs the sine variation signal U15 to the ON/OFF computing unit 3023; on the other hand, the trigonometric function calculator 30243 feeds the sine variation signal U15 back to the first multiplier 30242. The trigonometric function calculator 30243 performs a computation to form a first feedback signal U21 (having a value of $\cos\alpha t$), and the feedback circuit 30244 processes the first feedback signal U21 to obtain a second feedback signal U22 (having a value of in2), and the first adder 30241 performs a subtraction of the sampling signal and the second feedback signal to obtain a compare signal U17 (having a value of err1, and err1=in1−in2), and the first multiplier 30242 performs a multiplication of the compare signal U17 and the sine variation signal U15 to generate and transmitting a first computing signal U18 (having a value of ed1, and ed1=err1−$\sin\alpha t$) to the computing circuit 30245.

The computing circuit 30245 further comprises a second adder 302451, a first modulator 302452, a third adder 302453 and a time domain conversion circuit 302454 sequentially coupled to one another. The second adder 302451 is provided for receiving the first computing signal U18 transmitted from the first multiplier 30242 and performing a subtraction of the first computing signal U18 to obtain a second computing signal U19 (having a value of ed2, and ed2=0−ed1), and the first modulator 302452 is provided for receiving a second computing signal Ued2 outputted from the second adder 302451 and performing an addition of the second computing signal U19 according to the adjusting signal U36 (having a value of PI) to obtain a deviation signal U30 (having a value of $A\alpha$, and $A\alpha$=ed2-PI). The third adder 302453 is provided for receiving the deviation signal U30 outputted from the first modulator 302452, and computing a sine variation rate signal U31 (having a value of $\langle\!\langle$, and $\langle\!\langle$=$A\alpha t$+100n) according to the adjusting value (which is equal to 100n) of the first modulator 302452. The time domain conversion circuit 302454 is provided for receiving the sine variation signal U31 outputted from the third adder 302453 to perform a time domain conversion and obtain a time domain conversion signal U32 (having a value of ot, and $\langle\!\langle$t=/$\alpha$dt). The computing circuit 30245 transmits the time domain conversion signal U32 to the trigonometric function calculator 30243, and the trigonometric function calculator 30243 computes the time domain conversion signal U32 to obtain the sine variation signal sine variation signal U15 and the first feedback signal U21.

The feedback circuit 30244 comprises a second multiplier 302441, a second modulator 302442 and a third multiplier 302443, and the trigonometric function calculator 30243, the second multiplier 302441, the second modulator 302442, the third multiplier 302443 and the first adder 30241 are sequentially and electrically coupled to one another along a signal transmission direction. The second multiplier 302441 is coupled to an output terminal of the first adder 30241, and the third multiplier is coupled to an output terminal of the trigonometric function calculator 30243. The second multiplier 302441 is provided for receiving the first feedback signal U21 outputted from the trigonometric function calculator 30243 and receiving the compare signal U17 outputted from the first adder 30241, and perform a multiplication computing to obtain an anti-error signal U33 (having a value of err2, and err2=err1$\times$coswt). The second modulator 302442 is provided for receiving the anti-error signal U33 outputted from the second multiplier 302441 and performing an integration of the anti-error signal U33 to obtain an integration signal U34 (having a value of /err2, and Zerr2=/err1$\times$coswt). The third multiplier 302443 is provided for receiving the integration signal U34 outputted from the second modulator 302442 and the first feedback signal U21 outputted from the trigonometric function calculator 30243, and performing a multiplication of the integration signal U34 and the first feedback signal U21 to obtain the second feedback signal U22 (having a value of in2, and in2=(J Err2)x cos co)).

In FIG. 4, the current limiter 303 comprises a transistor 3031 and a first resistor 3032, wherein the transistor has a collector 30311 coupled to the power conversion module, a base 30312 coupled to an output end of the ON/OFF computing unit 3023, and an emitter 30313 coupled to an end of the first resistor 3032, and the other end of the first resistor is grounded. Persons having ordinary skill in the art can understand that the transistor 3031 controls its operating status to be ON or OFF according to the correction signal U16 received by the base to achieve the effect of the current limiting switching. The first resistor 3032 is provided for supplying an appropriate current to the power conversion module when the transistor 3031 is ON, so as to achieve the current limiting effect.

In FIG. 4, the sampler 301 is a serial circuit comprised of a second resistor 3011 and a third resistor 3012, and the serial circuit has an end coupled to the power conversion module and the other end grounded. The input terminal of the low-pass filter unit is coupled between the second resistor 3011 and the third resistor 3012. The second resistor 3011 and the third resistor 3012 achieve the voltage division effect to provide an appropriate voltage signal to the low-pass filter 304.

Figure 1:
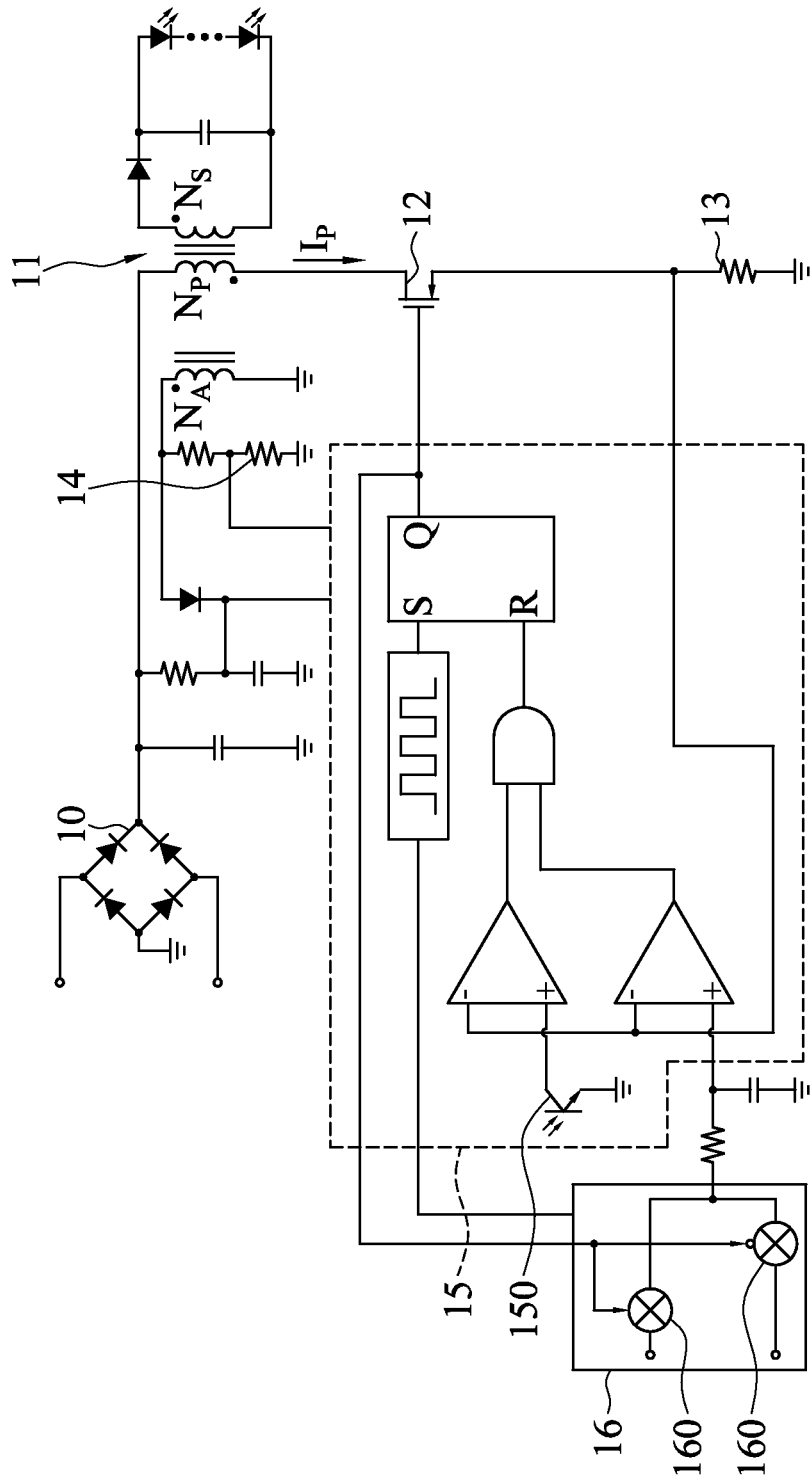
FIG. 1 is a schematic circuit diagram of a conventional PFC control circuit.
Figure 2:
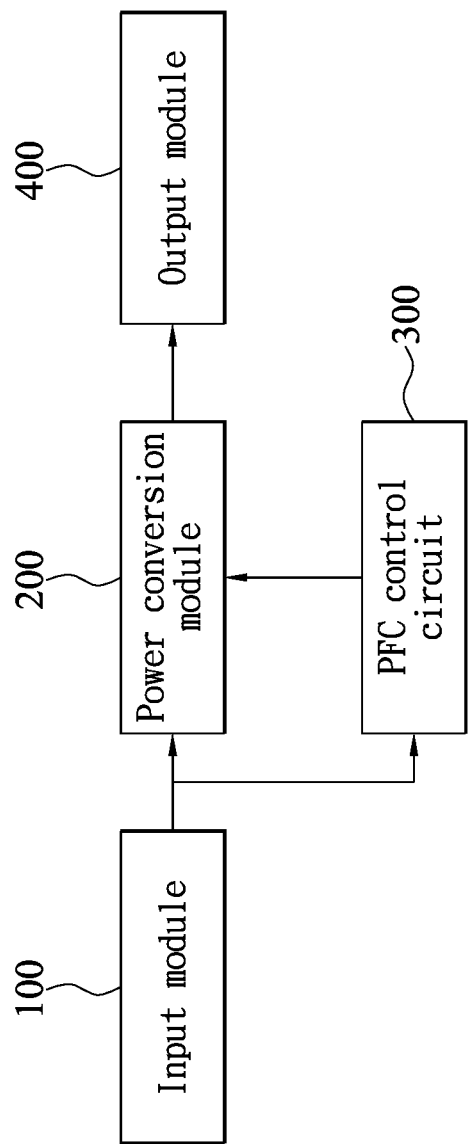
FIG. 2 is a schematic block diagram of a power adapter circuit in accordance with a preferred embodiment of the present invention.

With reference to FIG. 2 for a power adapter in accordance with the second preferred embodiment of the present invention, the power adapter comprises an input module 100, a power conversion module 200, an output module 400 and the power factor correction circuit 300 according to the first preferred embodiment, wherein the power conversion module 200 includes an input terminal and a control terminal, and the power factor correction circuit 300 is coupled between the input terminal and the control terminal. The power factor correction control module performs a computation according to the input signal received by the power conversion module 200 to generate and transmit a corresponding correction signal U16 to the control terminal to perform a correction of the power conversion module 200, so as to adjust the power factor property of the power adapter circuit and improve the power utilization.

Further, the input module 100 comprises a rectifier 1001, a filter circuit 1002 installed between the rectifier 1001 and the input power supply, and the rectifier 1001 has an end coupled to the input power supply and the other end coupled to the power conversion module 200 for converting the received AC signal into a DC signal, and transmitting the DC signal to the power conversion module 200. The filter circuit 1002 is provided for filtering the AC signal outputted from the external power supply. The power conversion module 200 comprises a primary inductor Np, a fourth resistor 2004, a first capacitor 2005 and a first diode 2006. The fourth resistor 2004 and the first capacitor 2005 form a serial circuit, and an end of the serial circuit is coupled to a cathode of the first diode 2006, and the other end coupled to an end of the primary inductor Np, and an anode of the first diode 2006 is coupled to the other end of the primary inductor. Both ends of the primary inductor Np are the input terminal 2001 and the control terminal of the power conversion module coupled to the input module 100 and the power factor correction circuit 300 respectively.

The output module 400 comprises a secondary inductor Ns, a second diode 4001 and a second capacitor 4002, wherein an anode of the second diode 4001 is coupled to an end of the secondary inductor Ns, and a cathode of the second diode 4001 is serially coupled to the second capacitor 4002 and then coupled to the other end of the secondary inductor Ns, and the secondary inductor Ns acts as an output terminal of the output module 400 to generate an appropriate output voltage signal of the output terminal, and the second capacitor 4002 acts as an output terminal of the output module 400 for connecting the electronic device 500 so as to supply a stable electric power to the electronic device 500.

What is claimed is:

1. A power factor correction circuit, comprising a sampler, a controller and a current limiter sequentially and electrically coupled to one another, characterized in that the controller comprises an error amplification unit, a peak value adjusting unit, an ON/OFF computing unit and a phase lock unit sequentially and electrically coupled to one another; the sampler is coupled to the phase lock unit; and the current limiter is coupled to the error amplification unit and the ON/OFF computing unit, wherein the power factor correction circuit further comprises a low-pass filter unit electrically coupled between the sampler and the phase lock unit, the phase lock unit comprises a first adder, a first multiplier, a trigonometric function calculator, a feedback circuit and a computing circuit; the first adder, the first multiplier, the computing circuit and the trigonometric function calculator are sequentially and electrically coupled to one another, and the feedback circuit is coupled between the first adder and the trigonometric function calculator.

2. The power factor correction circuit of claim 1, wherein the computing circuit comprises a second adder, a first modulator, a third adder and a time domain conversion circuit sequentially and electrically coupled to one another.

3. The power factor correction circuit of claim 1, wherein the feedback circuit comprises a second multiplier, a second modulator and a third multiplier, and the trigonometric function calculator, the second multiplier, the second modulator, the third multiplier and the first adder are sequentially and electrically coupled to one another along a signal transmission direction, and the second multiplier is coupled to an output terminal of the first adder, and the third multiplier is coupled to an output terminal of the trigonometric function calculator.

4. The power factor correction circuit of claim 3, wherein the current limiter comprises a transistor and a first resistor, and the transistor has a collector coupled to the power conversion module, a base coupled to an output terminal of the ON/OFF computing unit, and an emitter coupled to an end of the first resistor, and the other end of the first resistor is grounded.

5. The power factor correction circuit of claim 3, wherein the sampler is a serial circuit comprised of a second resistor and a third resistor, and an end of the serial circuit is coupled to the power conversion module, and the other end of the serial circuit is grounded, and an input terminal of the low-pass filter unit is coupled between the second resistor and the third resistor.

6. A power adapter, comprising an input module, a power conversion module and an output module sequentially and electrically coupled to one another, and the power conversion module includes an input terminal, a control terminal and the power factor correction circuit of claim 5, and the power factor correction circuit being coupled between the input terminal and the control terminal.

7. The power adapter of claim 6, wherein the input module includes a rectifier with an end coupled to an input power supply and the other end coupled to the power conversion module.

8. The power adapter of claim 6, wherein the power conversion module includes a primary inductor, a fourth resistor, a first capacitor and a first diode, and the fourth resistor and the first capacitor form a parallel circuit, and the parallel circuit has an end coupled to a cathode of the first diode and the other end coupled to an end of the primary inductor, and an anode of the first diode is coupled to the other end of the primary inductor.

* * * * *